United States Patent [19]

Winkler

[11] 4,432,741
[45] Feb. 21, 1984

[54] JOINT MEANS FOR TRANSMITTING A MOMENT OF ROTATION IN BOTH DIRECTIONS

[75] Inventor: Ottmar Winkler, Schweinfurt, Fed. Rep. of Germany

[73] Assignee: SKF Kugellagerfabriken GmbH, Schweinfurt, Fed. Rep. of Germany

[21] Appl. No.: 285,543

[22] Filed: Jul. 21, 1981

[30] Foreign Application Priority Data

Jul. 26, 1980 [DE] Fed. Rep. of Germany ....... 3028467

[51] Int. Cl.$^3$ ................................................ F16D 3/24
[52] U.S. Cl. ..................................... 464/145; 464/906
[58] Field of Search ................ 464/143, 145, 146, 906

[56] References Cited

U.S. PATENT DOCUMENTS

| | | | |
|---|---|---|---|
| 2,453,964 | 11/1948 | Betz | 464/143 X |
| 3,553,979 | 1/1971 | Noguchi et al. | 464/145 |
| 3,789,624 | 2/1974 | Camosso | 464/145 |
| 4,012,925 | 3/1977 | Krude | 464/906 X |
| 4,023,382 | 5/1977 | Welschof | 464/906 X |
| 4,070,872 | 1/1978 | Krude | 464/143 |
| 4,112,709 | 9/1978 | Krude | 464/145 X |

Primary Examiner—Stuart S. Levy
Assistant Examiner—Daniel P. Stodola
Attorney, Agent, or Firm—Eugene E. Renz, Jr.

[57] ABSTRACT

A universal joint assembly for transmitting a moment of rotation in both directions between two members comprising an outer joint element and an inner joint element, the joint elements have confronting spherical surfaces wherein one of the surfaces is smoothly spherical and the other surface has a series of generally axially extending circumferentially spaced grooves having flanks open at an angle, the joint assembly includes a plurality of rolling elements in the annular space between the confronting surfaces which engage in the grooves and a cage having a plurality of pockets disposed between the confronting surfaces of the joint elements for guiding the rolling elements. At least a pair of rolling elements are located in a common pocket of the cage and elastic preloaded member is disposed between the rolling elements in each pocket which is operable to press the rolling elements reciprocally in a peripheral direction against the related flank of the groove.

9 Claims, 16 Drawing Figures

JOINT MEANS FOR TRANSMITTING A MOMENT OF ROTATION IN BOTH DIRECTIONS

BACKGROUND AND SUMMARY OF THE INVENTION

The present invention relates to universal joints for transmitting a moment of rotation in both directions of rotation of relatively rotatable members, such as shafts or the like. The universal joint comprises an outer joint element with an essentially hollow spherical bore surface, an inner joint element with a generally spherical outer surface. One of the surfaces is smooth and the other is provided with a number of generally axially oriented grooves and distributed over its periphery having flanks which open outwardly at an angle and rolling elements arranged between the joint elements engaging in the grooves and guided in pockets of a cage which is also disposed between the confronting surfaces of the joint elements.

The prior art shows joint members generally of this configuration. For example, in German preliminary published application No. 2,219,868, the rolling elements are mounted individually in each pocket of the cage. This arrangement has several disadvantages and drawbacks. For example, production of this joint assembly requires very accurate machining of the grooves in either the outer or inner joint element and a precise finish of the spherical bore surface of these elements so that a slip-free contact of the rolling elements between the outer and inner joint elements is produced and relatively high moments of rotation can be transmitted with certainty. It has been found therefore, that these known joint assemblies are extremely expensive to produce. Additionally, in this known joint assembly, it has been observed that when changing the direction of the moment of rotation, a small rotational clearance exists between the rolling elements, and the groove since the rolling elements move from the inclined flank of one peripheral side of the groove to the opposite inclined flank of the other side of the same groove during a direction change. This rotational clearance may produce running jolts and running noises which are, of course, undesirable.

To this end, in accordance with the present invention, two rolling bodies are provided in a common pocket of the cage and an elastic preloaded means is installed between these rolling bodies which presses the rolling elements reciprocally in a peripheral direction against the flanges of the groove within which they engage. In this manner, a joint assembly for shafts or the like transmitting a moment of rotation in both directions of rotation, is provided wherein there is no rotational clearance when the direction of the moment of rotation is changed and therefore, the assembly is capable of withstanding high moments of rotation. Furthermore, this assembly can be produced rather economically.

With a universal joint assembly in accordance with the present invention wherein two rolling elements are arranged in a common pocket of the cage, one rolling element transmits the moment of rotation acting in one direction and the other transmits the moment of rotation acting in the other direction from the outer joint element to the inner joint element. A rotation clearance free change of direction of the moment of rotation in the joint assembly is provided at the same time since during a change, a displacement of the rolling elements in the grooves of the outer or inner joint element does not take place. Moreover, the joint elements of the assembly are moveable angularly relative to one another, and of course, in turn the axis of the shaft connected to one element is displaced relative to the axis of the shaft connected to the other joint element. During angular displacement in this fashion, the rolling elements roll in their respective grooves and by reason of the particular arrangement of at least a pair of rolling elements in each pocket and the elastic preloaded means, they maintain the desired form fit contact in the groove and the friction fit contact at the spherical bore surface of the outer joint element. In view of this, the confronting surfaces of the joint elements of the assembly, that is, the hollow spherical bore surface of the outer joint element and the spherical outer surface of the inner joint element can be relatively simply and economically produced since they may be manufactured with relatively large diameter tolerances.

Furthermore, the peripheral surface provided with the grooves can also be manufactured economically since the mutual distance of the inclined flanks of each groove do not have to conform to any critical accuracy. This distance may vary within broad limits since the elastically preloaded means between the rolling elements of each row always maintain the rolling elements in a form fit contact with the flanks of the groove which open outwardly at an angle.

The arrangement of the present invention also compensates for different heat expansions between the outer joint element and the inner joint element which occur during operation as a result of different running temperatures of the joint elements. For example, when an increased expansion of the inner joint element occurs, deleterious jamming of the rolling elements between the joint elements does not occur since they can be somewhat displaced in a peripheral direction against the bias of the elastically preloaded means. Similarly, there is no harmful radical clearance between the rolling elements and the joint elements during an increased heat expansion of the outer joint element.

The elastic means may comprise rather simple machine elements such as cup springs or coil springs which are easy to install between the confronting surface of two rolling elements located opposite each other in a peripheral direction and elastically press against the front surfaces thereof.

In accordance with a specific feature of the invention, the elastic means may comprise intermediate elements made of an elastically compressible material, such as plastic, which can be easily and economically produced by conventional injection molding process. Moreover, it is possible to hold the intermediate pieces radially in the bore surface of the outer joint element on the outside surface of the inner joint element and/or at the periphery of the rolling elements partly surrounding them and be guided along the walls of the pocket of the cage. The intermediate pieces may be elastically snapped in place between the rolling elements and in the cage pockets so that the rolling elements are prevented from falling radially out of the cage when the outer joint element is removed or pivoted thereby providing a self-contained unit consisting of rolling elements, intermediate pieces and cage.

In accordance with another feature of the present invention, relatively few grooves are necessary in the bore surface of the outer joint or on the outer surface of the inner joint element and in this manner further simplify the manufacturing process since two rolling elements of each pocket may be arranged in a common groove.

The bore surface of the outer joint is arranged concentrically to the spherical outer surface of the inner joint element so that the depth of the grooves in one of the confronting surfaces may be constant. Of course, grooves with a constant or uniform depth can be machined in the selected surface of the joint element simply and economically.

The cage is of a configuration to conform to the hollow spherical bore surface of the outer joint element and the spherical outer peripheral surface of the inner joint element so that it can rotate and slide on these two surfaces with a form fit. In this manner the rolling elements in the cage are at least partly relieved with respect to absorbing axial forces and consequently are capable of transmitting high moment of rotation forces acting in a peripheral direction without the danger of overloading.

DESCRIPTION OF THE DRAWINGS

These and other objects of the present invention and the various features and details of the operation and construction thereof are hereinafter more fully set forth with reference to the accompanying drawings, wherein.

DESCRIPTION OF THE PREFERRED EMBODIMENTS

Figure 1:
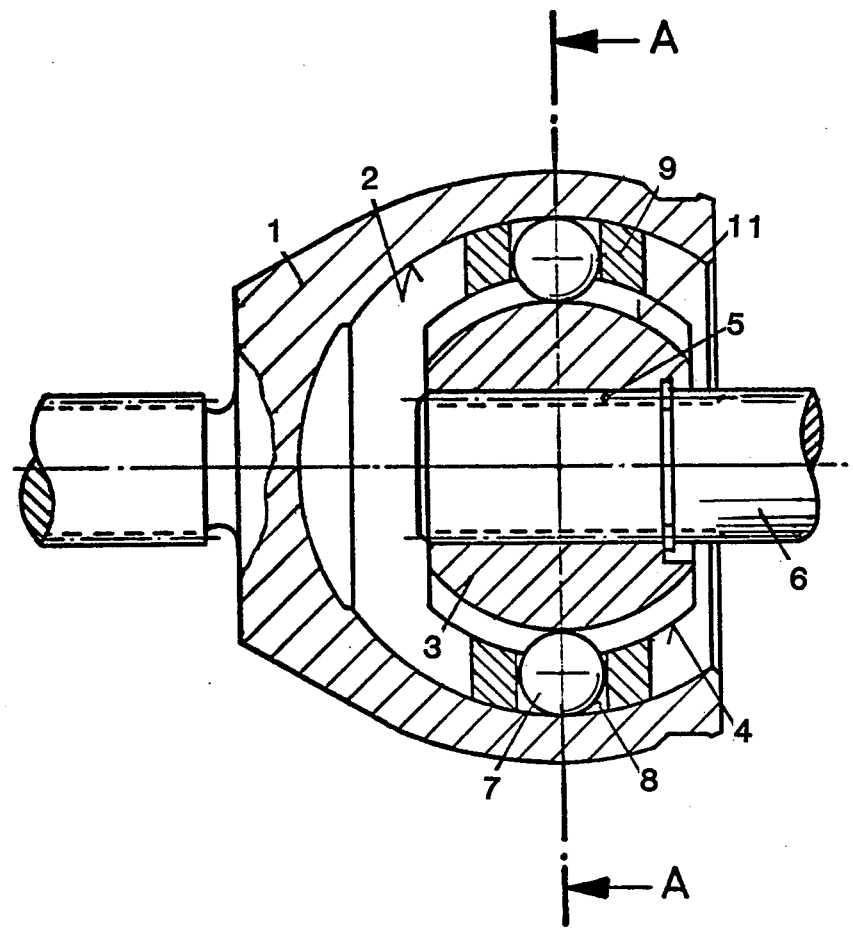
FIG. 1 is a longitudinal sectional view through a universal joint assembly in accordance with the present invention for transmitting a moment of rotation in both directions for relatively rotatable members, such as shafts.
Figure 2:
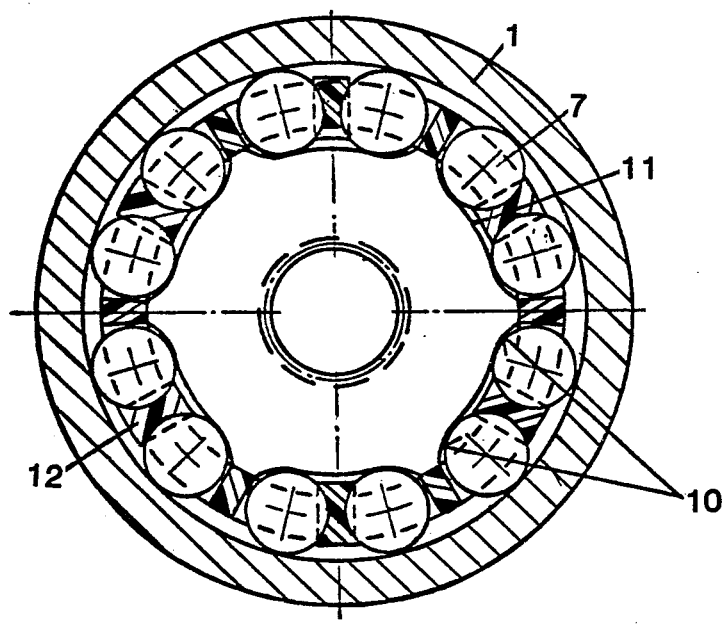
FIG. 2 is an enlarged sectional view taken on lines A—A of FIG. 1.

Referring now to the drawings and particularly to FIGS. 1 and 2 thereof, there is illustrated a universal joint assembly in accordance with the present invention for transmitting rotational movement between two members. The universal joint assembly comprises an outer joint element designated by the numeral 1 which has a hollow spherical bore surface 2 and an inner joint element 3 mounted interiorally of the outer joint element which has an outer spherical surface 4 and a plurality of rolling elements, in the present instance, spherical rolling elements, balls 7 arranged between the confronting surfaces of the inner and outer joint elements. The inner joint element is secured by means of a spline connection 5 so that it is nonrotatably mounted on the shaft 6. The assembly further includes a cage 9 having a plurality of circumferentially spaced pockets 8 for the balls 7. As illustrated in FIG. 2, at least a pair of rolling elements are disposed in a common pocket 8 of the cage which pockets 8 as illustrated are distributed about the periphery of the cage 9.

A series of axially extending circumferentially spaced grooves 11 are provided in one of the confronting surface of the inner and outer joint elements. In the present instance, the grooves 11 are disposed in the outer spherical surface 4 of the inner joint element 3. The balls track in these grooves which are of a configuration defining flanks 10 which open outwardly at an angle. The balls have in one peripheral direction a close conformity or form fit contact on the flanks 10 of the grooves 11 of the inner joint element 3 and a friction fit contact on the spherical bore surface 2 of the outer joint element 1. By arranging two balls 7 in each pocket 8, one ball of each pair absorbs the peripheral forces acting in one direction of the moment of rotation while the other ball of each pair transmits the peripheral forces acting in the other direction from the outer joint element 3.

In order to transmit axial load from the outer to the inner joint elements of the assembly, the cage 9 is of a configuration so that it conforms with a form fit to the spherical bore surface 2 of the outer joint element as well as to the spherical outer surface 4 of the inner joint element as illustrated in FIG. 1. More specifically, the cage 9 has arcuate or spherical inner and outer peripheral surfaces 9a and 9b conforming to the spherical contour of the inner and outer joint elements so that it can rotate and slide between the inner and outer joint elements. At the same time, the joint elements are concentrically guided by the cage 9.

Preloading means in the form of an elastically intermediate member 12 is mounted between the two balls 7 of each pocket 8. The elastic preloading means in the embodiment illustrated in FIGS. 1 and 2 is an element made from an elastically compressible material, such as a plastic, impregnated with a lubricant to minimize wear of the rolling elements during operation of the joint assembly. The intermediate member 12 presses the balls alternately in a peripheral direction against the related flank 10 of its groove 11 so that the balls 7 are each time elastically preloaded between a flank 10 and the hollow spherical bore surface 2. The direction of the moment of rotation to be transmitted can therefore be changed without having to overcome a clearance between the balls 7 and their contact points on the joint elements 1 and 3.

Figure 3:
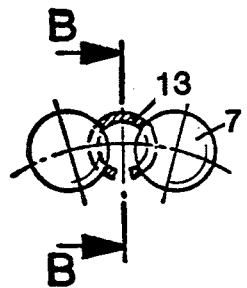
FIG. 3 is a fragmentary view showing one form of elastic means in the form of metal springs arranged between adjacent rolling elements of the assembly.
Figure 4:
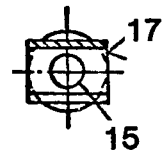
FIG. 4 is a view taken on lines B—B of FIG. 3.

In lieu of the plastic intermediate member 12, the preloading means may comprise a spring element of generally C-shaped cross section having spherical openings 12a in opposite legs thereof within which the balls engage. The metal springs are easy to install simply by snapping them in place between the adjacent balls of each pocket 8 of the cage 9. With the spring clip of the form shown in FIGS. 3 and 4, the balls snap into the openings 15 of the leg portions of the spring 13 which is in the nature of a circular leaf spring.

Figure 5:
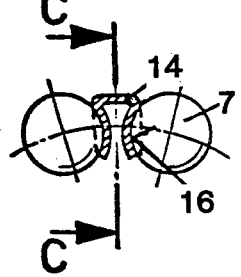
FIG. 5 is a fragmentary view of a modified metal spring clip serving as the elastic means between the adjacent rolling elements.
Figure 6:
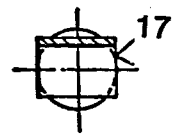
FIG. 6 is a view taken on lines C—C of FIG. 5.

There is illustrated in FIGS. 5 and 6 a modified form of spring designated by the numeral 14. Each leg of this form of spring clip has a spherical indentation 14a conforming to the balls and similar to the previously described embodiment snaps into place as a result of the elastic yielding of the legs of the spring which is stressed to bend.

Figure 7:
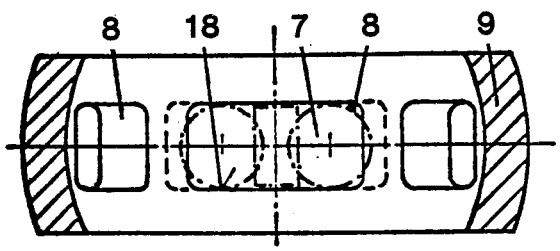
FIG. 7 is a transverse sectional view through the cage in accordance with the embodiment illustrated in FIG. 1 in a disassembled state.

Note that the intermediate member 12 as well as the spring clips 13 and 14 are of a configuration so that they snugly fit in the pockets so that they slide at their side surfaces 17 on the side walls 18 of the pocket 8 of the cage 9 in the manner illustrated in FIG. 7.

Figure 8:
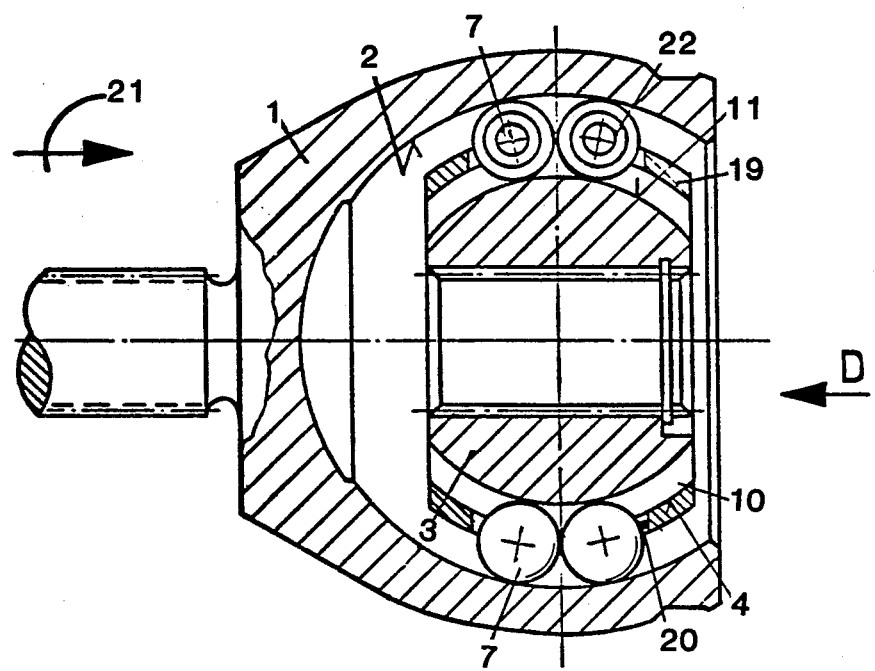
FIG. 8 is a longitudinal sectional view similar to FIG. 1 of a modified universal joint assembly in accordance with the present invention.
Figure 9:
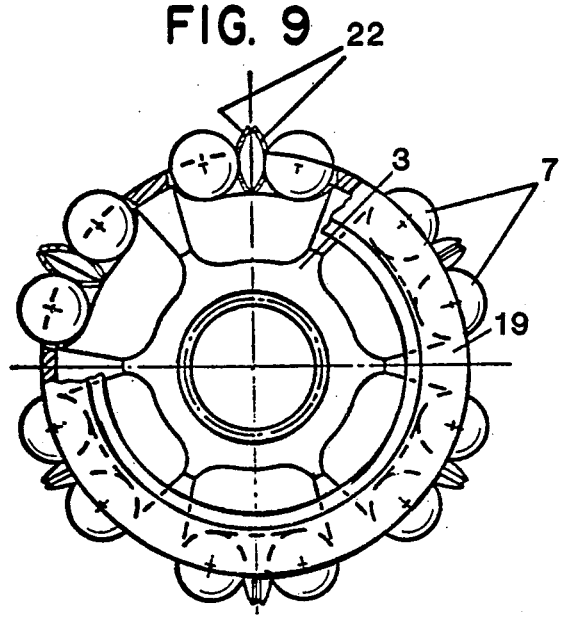
FIG. 9 is a front elevational view of the joint assembly of FIG. 8 as viewed in the direction of the arrow D and with the outer joint element removed.

There is illustrated in FIGS. 8 and 9 a modified universal joint assembly in accordance with the present invention for transmitting a moment of rotation in both directions similar to the previously described embodiment. The joint elements are essentially as described above and, accordingly, have been assigned the same reference numerals. The outer joint element 1 has a hollow spherical bore surface 2 and the inner joint element 3 has a spherical outer peripheral surface 4 wherein generally axially oriented circumferentially spaced grooves are formed, for example, by machining. However, in accordance with this embodiment, the rolling elements which are also balls 7 are arranged in side by side array in an axial direction adjacent one another.

Figure 10:
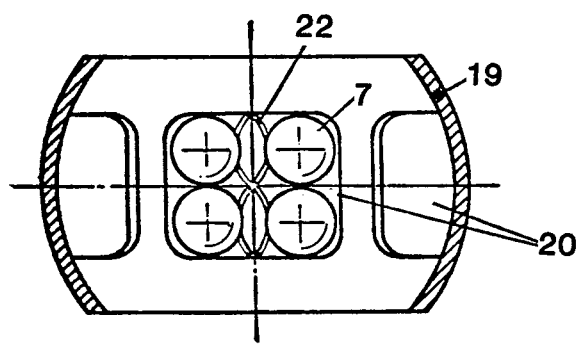
FIG. 10 is a transverse sectional view through the cage of the universal joint assembly of FIGS. 8 and 9 in a disassembled state.

A relatively thin-walled cage 19 having a series of circumferentially spaced pockets 20 for the balls is of a configuration in this instance so that it only slides on the spherical outer surface 4 of the inner joint element 3 and does not transmit axial forces from the outer joint element 1 to the inner joint element 3 (see FIG. 10).

In accordance with this embodiment two balls 7 which are in side by side axial array, are mounted in a common pocket 20 of the cage 19 so that during axial load on the outer joint element in the direction of the arrow 21 in FIG. 8, the balls 8 of the left hand row of balls are loaded and transmit the axial load from the outer joint element to the inner joint element and in an opposite direction of rotation, the balls in the right hand row absorb the axial load.

As in the previously described embodiment, an elastic means, in the present instance, in the form of cup springs 22 are snapped in place between the balls of each pocket 20 in the cage and are arranged in a peripheral direction next to each other so that the balls press elastically in a peripheral direction against the related flank 10 of their respective groove 11 and alternately preload.

Figure 11:
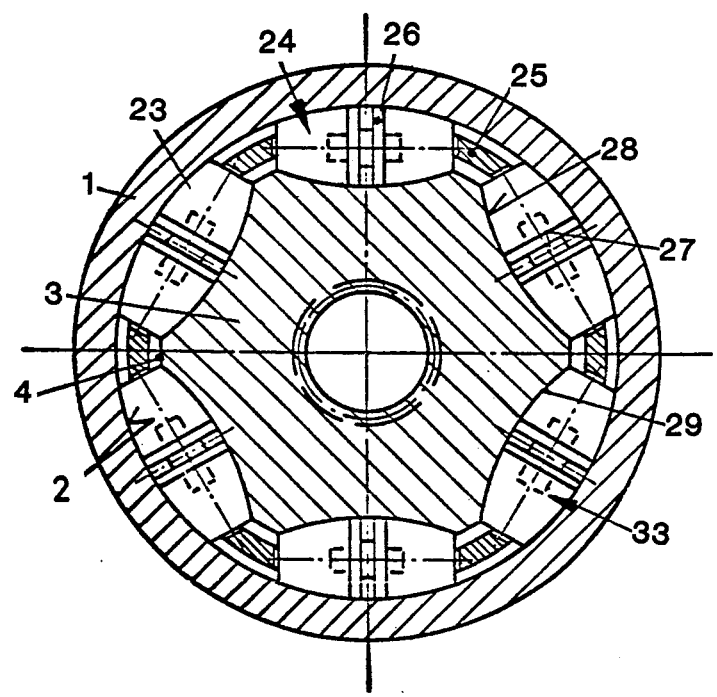
FIG. 11 is a transverse sectional view of a still further modified universal joint assembly in accordance with the present invention incorporating barrel shaped rollers.

There is illustrated in FIG. 11 a further modified universal joint assembly for transmitting moments of rotation in both directions which similar to the previously described embodiments comprises an outer joint member 1, an inner joint member 3 and a plurality of rolling elements in the annular space between the confronting surfaces of the joint elements. In the present instance, the rolling elements comprise barrel shaped rollers 23 having spherical surfaces which conform to the inner peripheral surface of the outer joint member. In this embodiment, a pair of rollers are arranged in a common pocket 24 of the cage 25. An intermediate member 26 of an elastic material such as plastic is snapped in place between the complementary pairs of rollers which engages the rollers of each pair at their confronting inner axial end faces 27 and preloads the rollers in a peripheral direction against the flank 28 of grooves 29 formed in the inner joint element 3.

Figure 12:
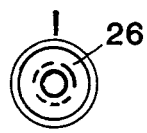
FIG. 12 is a front view of the intermediate element of the member used as the elastic means in the FIG. 11 joint assembly.
Figure 13:
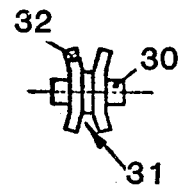
FIG. 13 is a side elevational view of the intermediate piece shown in FIG. 12.

The intermediate member 26 as best illustrated in FIGS. 12 and 13 comprises a generally cylindrical center section 31 having lugs 30 projecting from opposite ends thereof and outwardly flared flexible supporting discs 32 between the lugs and the center section 31. The pair of rollers in each pocket 24 of the cage 25 are provided with bores 33 in their confronting axial end faces within which the lugs 30 engage. By this arrangement, the axis of rotation of the rollers point in a peripheral direction, that is, somewhat tangential to the spherical bore surface 2 of the outer joint element and to the spherical outer surface 4 of the inner joint element 3.

Figure 14:
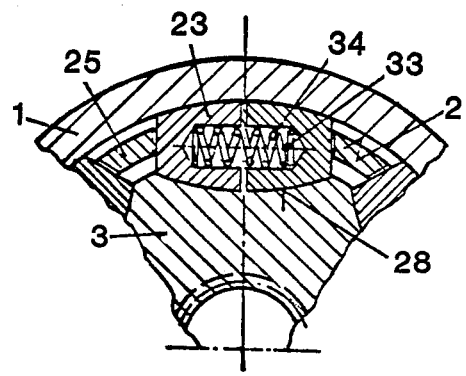
FIG. 14 is an enlarged fragmentary sectional view showing a further modified universal joint assembly in accordance with the present invention with a row of barrel shaped rollers.

FIG. 14 shows a further modified universal joint assembly for transmitting moments of rotation in both directions which is of a construction and configuration generally similar to that illustrated in FIG. 11. In this instance, the rolling elements are also barrel-shaped rollers 23 which are arranged between the confronting surfaces of the inner and outer joint element 1 and the inner joint element 3. Again, two rollers are mounted in a common pocket 24 of the cage 25. The confronting axial ends of each pair of rollers are likewise provided with blind end bores 33 and in this instance, a common coil spring 34 which reciprocally presses as the elastically preloaded means the rollers in a peripheral direction against the related flank 28 of the groove 29 formed in the peripheral surface of the inner joint element 3.

Figure 15:
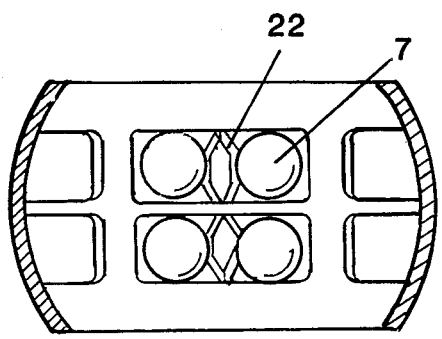
FIG. 15 is a transverse sectional view of a further modified cage arrangement for a universal joint assembly in accordance with the present invention.

Even though particular embodiments of the present invention have been illustrated and described herein, it is not intended to limit the invention and changes and modifications may be made therein within the scope of the following claims. For example, in universal joints with two or more axially adjacent rolling elements, two rolling elements arranged one after the other in a peripheral direction may each time be installed in a single pocket of the cage whereby the two axially adjacent rolling elements are separated by braces of the pockets of the cage in such a way that they do not mutually engage each other as shown in FIG. 15.

Figure 2A:
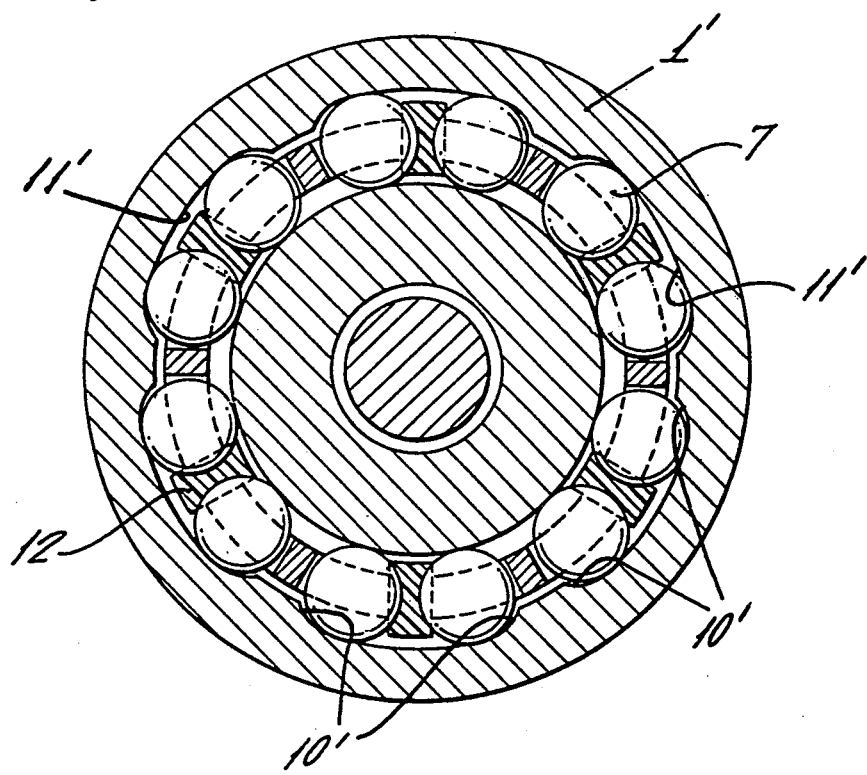
FIG. 2a is a sectional view similar to FIG. 2 of a modified embodiment wherein the grooves of the rolling elements are formed in the outer joint element.

Further, while all of the embodiments show the grooves for the rolling elements as being formed on the inner joint element, it is to be understood that grooves 11' having flanks 10' which open inwardly at an angle may be instead formed on the bore surface of the outer joint element 1' as shown in FIG. 2a. The rolling elements then have a form fit contact in a peripheral direction in the grooves 11' of the outer joint element 1' and a friction fit contact on the spherical outer surface of the inner joint element. Further, the two rolling elements of each pocket may also be arranged in an individual groove of the bore surface of the outer joint element or of the outside surface of the inner joint element.

What is claimed is:

1. A universal joint assembly for transmitting a moment of rotation in both directions between two members comprising an outer joint element, an inner joint element, said elements having confronting surfaces, a plurality of rolling elements in the annular space between the confronting surfaces, one of said surfaces being smooth and the other surface having a series of generally axially extending circumferentially spaced grooves forming raceways for the rolling elements and having flanks at each side of the raceway which open at an angle and at least a pair of rolling elements in each raceway, elastic preload means disposed between the rolling elements of each pair in each raceway operable to contact and separate the rolling elements of each pair thereby to preload the rolling elements away from one another and to press the rolling elements reciprocally in a peripheral direction against the related flank of the raceway groove and said one smooth surface.

2. A universal joint assembly as claimed in claim 1 wherein the elastic means comprise spring elements.

3. A universal joint assembly as claimed in claim 2 wherein said spring elements are made of metal.

4. A universal joint as claimed in claim 1 wherein the elastic means comprise elements made of an elastically compressible material.

5. A universal joint as claimed in claim 4 wherein said elastically compressible material is plastic.

6. A universal joint assembly as claimed in claim 1 wherein said grooves are disposed in the bore surface of the outer joint element.

7. A universal joint assembly as claimed in claim 1 wherein said grooves are located on the outer peripheral surface of said inner joint element.

8. A universal joint assembly as claimed in claim 1 wherein the spherical bore surface of the said outer joint element is disposed concentrically to the spherical outer surface of the inner joint element.

9. A universal joint assembly as claimed in claim 1 wherein said outer joint member has a hollow spherical bore surface and said cage has inner and outer peripheral circumferentially extending surfaces conforming to the hollow spherical bore surface of the outer joint element and to the spherical outer surface of the inner joint element so that it rotates and slides on these surfaces with a close conforming fit and thereby has a capability of transmitting axial load.

* * * * *